(12) United States Patent
Kock et al.

(10) Patent No.: US 9,181,423 B2
(45) Date of Patent: Nov. 10, 2015

(54) STIFF POLYPROPYLENE COMPOSITION WITH EXCELLENT ELONGATION AT BREAK

(75) Inventors: Cornelia Kock, Pucking (AT); Christelle Grein, Linz (AT); Tonja Schedenig, Enns (AT)

(73) Assignee: Borealis AG, Vienna (AT)

( * ) Notice: Subject to any disclaimer, the term of this patent is extended or adjusted under 35 U.S.C. 154(b) by 90 days.

(21) Appl. No.: 13/818,407

(22) PCT Filed: Aug. 25, 2011

(86) PCT No.: PCT/EP2011/064619
§ 371 (c)(1),
(2), (4) Date: Apr. 26, 2013

(87) PCT Pub. No.: WO2012/025584
PCT Pub. Date: Mar. 1, 2012

(65) Prior Publication Data
US 2013/0203908 A1    Aug. 8, 2013

(30) Foreign Application Priority Data

Aug. 27, 2010   (EP) .................................... 10174268

(51) Int. Cl.
| *C08L 23/14* | (2006.01) |
|---|---|
| *C08L 23/06* | (2006.01) |
| C08K 3/34 | (2006.01) |
| C08K 5/00 | (2006.01) |
| C08L 23/08 | (2006.01) |
| C08L 23/12 | (2006.01) |
| C08L 23/16 | (2006.01) |

(52) U.S. Cl.
CPC ................. *C08L 23/14* (2013.01); *C08L 23/06* (2013.01); *C08L 23/142* (2013.01); *C08K 3/346* (2013.01); *C08K 5/0083* (2013.01); *C08L 23/0815* (2013.01); *C08L 23/12* (2013.01); *C08L 23/16* (2013.01); *C08L 2205/035* (2013.01); *C08L 2205/22* (2013.01); *C08L 2207/02* (2013.01)

(58) Field of Classification Search
CPC .................................. C08L 23/14; C08L 23/06
USPC .................................................. 524/119, 451
See application file for complete search history.

(56) References Cited

FOREIGN PATENT DOCUMENTS

| CN | 101309961 A1 | 11/2008 |
|---|---|---|
| EP | 1236769 A1 | 9/2002 |
| EP | 1801156 | * 12/2005 |
| EP | 1801156 A1 | 6/2007 |
| WO | 2007057142 A1 | 5/2007 |
| WO | 2008148695 A1 | 6/2007 |
| WO | 2008148695 A1 | 12/2008 |

OTHER PUBLICATIONS

Chinese Office Action dated Jul. 3, 2014.

* cited by examiner

*Primary Examiner* — James J Seidleck
*Assistant Examiner* — Deve E Valdez
(74) *Attorney, Agent, or Firm* — Tarolli, Sundheim, Covell & Tummino LLP

(57) ABSTRACT

Polypropylene composition comprising (a) a high melt strength polypropylene having a melt flow rate MFR2 (230° C.) of equal or below 15 g/10 min and a branching index g' of below 1.0, (b) a first heterophasic propylene copolymer comprising a polypropylene having a melt flow rate MFR2 (230° C.) in the range of 50 to 500 g/10 min and an elastomeric propylene copolymer having a propylene content in the range of 50 to 80 wt.-% and an intrinsic viscosity (IV) of equal or more than 2.5 dl/g, (c) a second heterophasic propylene copolymer comprising a random propylene copolymer having a melt flow rate MFR2 (230° C.) in the range of 1 to 40 g/10 min, a branching index g' of 1.0, and a comonomer content of more than 0.5 wt.-%, and an elastomeric propylene copolymer having a propylene content in the range of 50 to 80 wt.-%, and an intrinsic viscosity (IV) of equal or below 2.4 dl/g, (d) a polyethylene plastomer having an ethylene content of at least 50 wt.-%, and (e) a mineral filler (F).

15 Claims, 1 Drawing Sheet

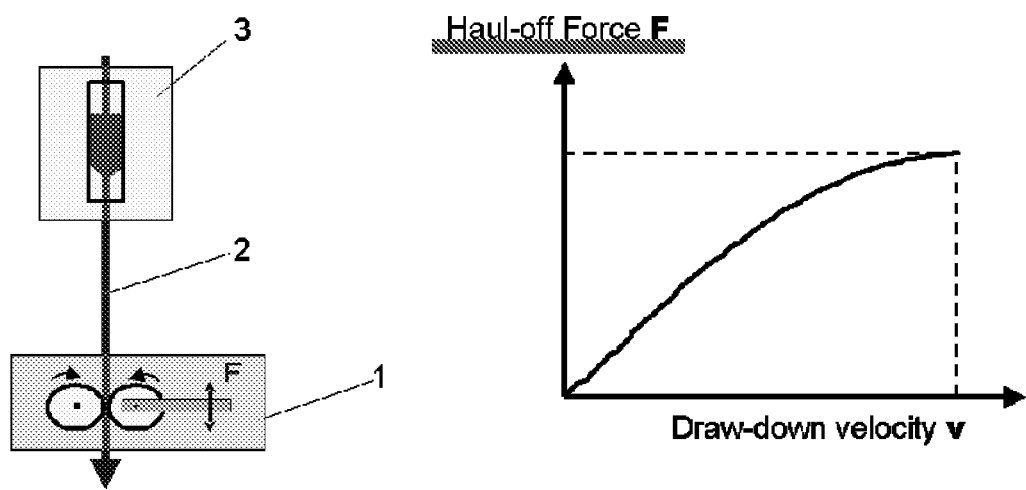

STIFF POLYPROPYLENE COMPOSITION WITH EXCELLENT ELONGATION AT BREAK

RELATED APPLICATION

This application is a National Phase filing of PCT/EP2011/064619, filed Aug. 25, 2011, and claims priority to European Application No. 10174268.2, filed Aug. 27, 2010, the subject matter of which are incorporated herein by reference in their entirety.

The present invention is directed to a new polypropylene composition with excellent elongation at break and high stiffness, as well as to its use and materials made out of it.

Polypropylene is the material of choice in many applications as it can be tailored to specific purposes needed. For instance polypropylene is widely used in the automobile industry as it is long-lasting and robust. Typically polypropylene is additivated inter alia with mineral fillers to improve stiffness. However, the presence of commercial fillers normally negatively affects the ductility of polypropylene. Heterophasic polypropylene systems can compensate to some extent this negative trend caused by mineral fillers. Accordingly heterophasic polypropylenes are widely used in the automobile industry (for instance in bumper applications) as they combine reasonable stiffness with good ductility. Heterophasic polypropylenes contain a polypropylene matrix in which an amorphous phase is dispersed. The amorphous phase contains a propylene copolymer rubber, like an ethylene propylene rubber (EPR) or an ethylene propylene diene monomer polymer (EPDM). Further the heterophasic polypropylene may contain a crystalline polyethylene to some extent. Typically the amount of mineral fillers, like talc, within the heterophasic systems is 5 to 30 wt.-%. Overall such materials offer an accepted balance of stiffness and ductility. However, nowadays the automotive industry seeks for more ambitious materials. For instance there is the desire that the materials show good stiffness and exceptional high ductility.

Thus the object of the present invention is to provide a material which exhibits good stiffness and exceptional high ductility.

The finding of the present invention is to add to a heterophasic propylene copolymer with propylene rich elastomeric phase a heterophasic propylene copolymer with low intrinsic viscosity and a polyethylene plastomer with moderate intrinsic viscosity.

Accordingly the present invention is directed to a polypropylene composition ($1^{st}$ embodiment) comprising
(a) a first heterophasic propylene copolymer (HECO1) comprising
  (i) a polypropylene (PP1) having a melt flow rate $MFR_2$ (230° C.) measured according to ISO 1133 in the range of 50 to 500 g/10 min, and
  (ii) an elastomeric propylene copolymer (E1) having
    (α) a propylene content in the range of 50 to 80 wt.-%, and
    (β) an intrinsic viscosity (IV) measured according to ISO 1628-1 (at 135° C. in decaline) of equal or more than 2.5 dl/g,
(b) a high melt strength polypropylene (HMS-PP) having
  (i) a branching index g' of below 1.0, and
  (ii) a melt flow rate $MFR_2$ (230° C.) measured according to ISO 1133 of equal or below 15 g/10 min,
(c) a second heterophasic propylene copolymer (HECO2) comprising
  (i) a random propylene copolymer (R-PP2) having
    (α) a melt flow rate $MFR_2$ (230° C.) measured according to ISO 1133 in the range of 1 to 40 g/10 min,
    (β) a branching index g' being higher than the branching index g' of the high melt strength polypropylene (HMS-PP), and
    (γ) a comonomer content of equal or more than 0.5 wt.-%, the comonomers are ethylene and/or $C_4$ to $C_{12}$ α-olefins,
  (ii) an elastomeric propylene copolymer (E2) having
    (α) a propylene content in the range of 50 to 80 wt.-%, and
    (β) an intrinsic viscosity (IV) measured according to ISO 1628-1 (at 135° C. in decaline) of equal or below 2.4 dl/g,
(d) a polyethylene plastomer (PE) having
  (i) an ethylene content of at least 50 wt.-%, and
  (ii) a density measured according to ISO 1183-187 in the range of 820 to 920 kg/m³, and
(e) a mineral filler (F).

It has been surprisingly found out that such a polypropylene composition has excellent ductility and high stiffness compared to known heterophasic propylene copolymer compositions.

Accordingly the invention can be also defined as a propylene composition ($2^{nd}$ embodiment) being a heterophasic system comprising
(a) a high melt strength polypropylene (HMS-PP) having
  (i) a branching index g' of below 1.0, and
  (ii) a melt flow rate $MFR_2$ (230° C.) measured according to ISO 1133 of equal or below 15 g/10 min,
(b) a polypropylene (PP1) having a melt flow rate $MFR_2$ (230° C.) measured according to ISO 1133 in the range of 50 to 500 g/10 min,
(c) a random propylene copolymer (R-PP2) having
  (i) a melt flow rate $MFR_2$ (230° C.) measured according to according to ISO 1133 in the range of 1 to 40 g/10 min,
  (ii) a branching index g' being higher than the branching index g' of the high melt strength polypropylene (HMS-PP), and
  (iii) a comonmer content of equal or more than 0.5 wt.-%, the comonomers are ethylene and/or $C_4$ to $C_{12}$ α-olefins,
(d) an elastomeric propylene copolymer system having
  (i) a propylene content in the range of 50 to 80 wt.-%, and
  (ii) an intrinsic viscosity (IV) measured according to ISO 1628-1 (at 135° C. in decaline) in the range of 2.0 to 3.0 dl/g,
(e) a polyethylene plastomer (PE)
  (i) an ethylene content of at least 50 wt.-%, and
  (ii) a density measured according to ISO 1183-187 in the range of 820 to 920 kg/m³, and
(f) a mineral filler (F),
wherein the polypropylene (PP1), the random propylene copolymer (R-PP2), and the high melt strength polypropylene (HMS-PP) constitute the matrix of the heterophasic system in which the elastomeric propylene copolymer system, the polyethylene plastomer (PE) and the mineral filler (F) are dispersed,
and wherein further the polypropylene composition has
(g) a tensile modulus measured according to ISO 527-3 of at least 1500 MPa and
(h) tensile strain at break measured according to ISO 527-3 of at least 200%.

In the following the $1^{st}$ and $2^{nd}$ embodiment will be described in more detail together.

The present invention is preferably a propylene composition being a heterophasic system. The expression "heterophasic" indicates that an elastomeric phase as well as the mineral filler (F) is (finely) dispersed in the matrix. In other words the elastomeric phase and the filler (F) forms inclusions in the matrix. Thus the matrix contains (finely) dispersed inclusions being not part of the matrix and said inclusions contain the elastomeric material and the mineral filler (F), respectively. The term "inclusion" according to this invention shall preferably indicate that the matrix and the inclusion form different phases within the heterophasic propylene copolymer, said inclusions are for instance visible by high resolution microscopy, like electron microscopy or scanning force microscopy.

Accordingly the polypropylene (PP1), the random propylene copolymer (R-PP2), and the high melt strength polypropylene (HMS-PP) together constitute the matrix of the propylene composition being a heterophasic system. On the other hand the elastomeric propylene copolymer (E1), the elastomeric propylene copolymer (E2), the polyethylene plastomer (PE) and the mineral filler (F) are (finely) dispersed in said matrix. Thereby the elastomeric propylene copolymer (E1) and the elastomeric propylene copolymer (E2) form preferably an intimate mixture being the elastomeric propylene copolymer system.

The inventive propylene composition, i.e. the propylene composition being a heterophasic system, may contain further additives, like the mineral filler (F) but no other polymer in an amount exceeding 2.5 wt-%, more preferably exceeding 1.0 wt.-%, like exceeding 0.5 wt.-%, based on the total propylene composition. One additional polymer which may be present in such low amounts is a crystalline polyethylene insoluble in cold xylene which is a by-reaction product obtained by the preparation of the individual heterophasic propylene copolymers (HECO1 and HECO2) (see in detail below). Accordingly it is in particular appreciated that the instant polypropylene composition contains only the polymer components indicated above and optionally polyethylene in amounts as mentioned in this paragraph.

The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that the inventive polypropylene composition has a melt flow rate $MFR_2$ (230° C.) in the range of 5 to 50 g/10 min, more preferably of 10 to 30 g/10 min, still more preferably of 12 to 25 g/10 min.

Preferably the total polypropylene composition has a xylene cold soluble fraction (XCS) measured according to ISO 6427 in the range of 15 to 40 wt.-%, more preferably in the range of 20 to 35 wt.-%.

One remarkable feature of the inventive polypropylene composition is exceptional high ductility. Accordingly it is appreciated that the polypropylene composition has a tensile strain at break measured according to ISO 527-3 of at least 200%, more preferably of at least 250%, yet more preferably of at least 300%, like at least 320%, still more preferably in the range of 250 to 500%, like in the range of 300 to 450%.

Additionally or alternatively the inventive polypropylene composition is rather stiff, i.e. has a tensile modulus measured according to ISO 527-3 of at least 1500 MPa, more preferably of at least 1600 MPa, yet more preferably of at least 1700 MPa, still more preferably in the range of 1500 to 3000 MPa, like in the range of 1600 to 2600 MPa.

Preferably the inventive polypropylene composition comprises as polymer components only the first heterophasic propylene copolymer (HECO1), the second heterophasic propylene copolymer (HECO2), the high melt strength polypropylene (HMS-PP), and the polyethylene plastomer (PE) only. Thus in the following the polypropylene composition will be described in more detail, by the individual components.

One requirement of the instant invention is the presence of a high melt strength polypropylene (HMS-PP) in the polypropylene composition. Such a polymer type is characterized by a certain degree of branching. Possible high melt strength polypropylenes (HMS-PP) are so called Y/H-polypropylenes and for instance described in EP 0 787 750, i.e. single branched polypropylene types (Y polypropylenes having a backbone with a single long side-chain and an architecture resembles a "Y") and polypropylene types in which polymer chains are coupled with a bridging group (an architecture resembles a "H"). Such polypropylenes are characterized by rather high melt strength. A parameter of the degree of branching is the branching index g'. The branching index g' correlates with the amount of branches of a polymer. Thereby, a low g'-value is an indicator for a high branched polymer. In other words, if the g'-value decreases, the branching of the polypropylene increases. The exact determination of the g'-value is specified in the example section. Thus it is preferred that the branching index g' of the high melt strength polypropylene (HMS-PP) shall be less than 1.0, more preferably equal or less than 0.9, like less than 0.8. In another preferred embodiment the branching index g' of the high melt strength polypropylene (HMS-PP) shall be preferably less than 0.7.

The high degree of branching of the high melt strength polypropylene (HMS-PP) contributes also to its melt strength. Accordingly it is preferred that the high melt strength polypropylene (HMS-PP) is further characterized by a strain hardening behavior with a haul-off force $F_{max}$ of at least 10.0 cN and a draw down velocity $v_{max}$ of at least 200 mm/s, more preferably by a strain hardening behavior with a haul-off force $F_{max}$ of at least 20.0 cN and a draw down velocity $v_{max}$ of at least 250 mm/s, yet more preferably by a strain hardening behavior with a haul-off force $F_{max}$ of at least 25.0 cN and a draw down velocity $v_{max}$ of at least 250 mm/s.

Such a high melt strength polypropylene (HMS-PP) is preferably obtained by modifying, i.e. chemically modifying, a polypropylene. Such a modification is necessary to achieve the branching structure and/or the strain hardening phenomena of the high melt strength polypropylene (HMS-PP). Such a modification has also influence on the gel content of the high melt strength polypropylene (HMS-PP). Accordingly it is justified to define the high melt strength polypropylene (HMS-PP) further and/or alternatively by its gel content. Thus it is appreciated that the high melt strength polypropylene (HMS-PP) is featured by a relatively moderate gel content, i.e. of not more than 1.00 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the high melt strength polypropylene (HMS-PP) may show a certain degree of branching and thus a certain amount of gel content, i.e. of at least 0.15 wt.-%, more preferably of at least 0.27 wt.-%. Thus a preferred range for the gel content of the high melt strength polypropylene (HMS-PP) is 0.05 to 0.90 wt.-%, more preferred 0.26 to 0.8 wt.-%.

Additionally it is preferred that in the melt strength polypropylene (HMS-PP) has an $MFR_2$ (230° C.) of equal or below 15.0 g/10 min, more preferably in a range of 0.5 to 10.0 g/10 min, more preferably of 1.0 to 8.5 g/10 min, still more preferably of 2.0 to 8.0 g/10 min.

Preferably, the high melt strength polypropylene (HMS-PP) has a density of at least 850 kg/m$^3$, more preferably of at least 875 kg/m$^3$ and most preferably of at least 900 kg/m$^3$.

Further, preferably, the high melt strength polypropylene (HMS-PP) has a density of not more than 950 kg/m$^3$, more preferably of not more than 925 kg/m$^3$ and most preferably of not more than 910 kg/m$^3$.

Preferably, the high melt strength polypropylene (HMS-PP) has a melting point of at least 140° C., more preferably of at least 150° C. and most preferably of at least 160° C.

As stated above, the melt strength polypropylene (HMS-PP) is preferably a modified polypropylene. Accordingly the melt strength polypropylene (HMS-PP) can be further defined by the way obtained. Thus the melt strength polypropylene (HMS-PP) is preferably the result of treating an unmodified polypropylene (A) with thermally decomposing radical-forming agents and/or with ionizing radiation. However, in such a case a high risk exists that the polypropylene (A) is degraded, which is detrimental. Thus it is preferred that the modification is accomplished by the use of bifunctionally unsaturated monomer(s) and/or multifunctionally unsaturated low molecular weight polymer(s) as chemically bound bridging unit(s). A suitable method to obtain the melt strength polypropylene (HMS-PP) is for instance disclosed in EP 0 787 750, EP 0 879 830 A1 and EP 0 890 612 A2. All documents are herewith included by reference. Thereby, the amount of peroxide is preferably in the range of 0.05 to 3.00 wt.-% based on the unmodified polypropylene (A).

Accordingly in one preferred embodiment the high melt strength polypropylene (HMS-PP) comprises units derived from
(i) propylene and
(ii) bifunctionally unsaturated monomer(s) and/or multifunctionally unsaturated low molecular weight polymer(s).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the polypropylene (A).

Reaction of the bifunctionally unsaturated monomer(s) and/or multifunctionally unsaturated low molecular weight polymer(s), preferably having a number average molecular weight $(M_n) \leq 10000$ g/mol, synthesized from one and/or more unsaturated monomers with the propylene polymer composition may be performed in the presence of a thermally free radical forming agent, e.g. decomposing free radical-forming agent, like a thermally decomposable peroxide and/or ionizing radiation or microwave radiation.

The bifunctionally unsaturated monomers may be
  divinyl compounds, such as divinylaniline, m-divinylbenzene, p-divinylbenzene, divinylpentane and divinylpropane;
  allyl compounds, such as allyl acrylate, allyl methacrylate, allyl methyl maleate and allyl vinyl ether;
  dienes, such as 1,3-butadiene, chloroprene, cyclohexadiene, cyclopentadiene, 2,3-dimethylbutadiene, heptadiene, hexadiene, isoprene and 1,4-pentadiene;
  aromatic and/or aliphatic bis(maleimide) bis(citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight $(M_n) \leq 10000$ g/mol may be synthesized from one or more unsaturated monomers.

Examples of such low molecular weight polymers are
  polybutadienes, especially where the different microstructures in the polymer chain, i.e. 1,4-cis, 1,4-trans and 1,2-(vinyl) are predominantly in the 1,2-(vinyl) configuration
  copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The high melt strength polypropylene (HMS-PP) may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength polypropylene (HMS-PP) is 0.01 to 10.0 wt.-% based on said high melt strength polypropylene (HMS-PP).

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:
Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy)valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl)perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Or mixtures of these above listed free radical-forming agents.

The unmodified polypropylene (A) to prepare such a high melt strength polypropylene (HMS-PP) has preferably an $MFR_2$ (230° C.) in a range of 0.05 to 20.00 g/10 min. More preferably the $MFR_2$ (230° C.) is in a range of 0.05 to 15.00 g/10 min in case the unmodified polypropylene (A) is a homopolymer. On the other hand the $MFR_2$ (230° C.) is in a range of 0.05 to 45.00 g/10 min in case the unmodified polypropylene (A) is a copolymer.

Preferably the unmodified polypropylene (A) is a homopolymer.

Preferably the high melt strength polypropylene (HMS-PP) is produced from the unmodified polypropylene (A) as defined above under process conditions as defined in detail below.

The first heterophasic propylene copolymer (HECO1) comprises as a matrix the polypropylene (PP1) and dispersed therein the elastomeric propylene copolymer (E1). Preferably the polypropylene (PP1) and the elastomeric propylene copolymer (E1) are the only polymer components of the first heterophasic propylene copolymer (HECO1). Only minor amounts of crystalline polyethylene as indicated above and/or polymeric an α-nucleating agent as defined below may additionally present in amounts not exceeding 1 wt.-%.

Preferably the first heterophasic propylene copolymer (HECO1) has a melt flow rate $MFR_2$ (230° C.) measured according to ISO 1133 in the range of 15 to 70 g/10 min, more preferably in the range of 20 to 60 g/10 min, like in the range of 25 to 50 g/10 min.

Preferably it is desired that the first heterophasic propylene copolymer (HECO1) is thermomechanically stable. Accordingly it is appreciated that the first heterophasic propylene copolymer (HECO1) has a melting temperature of at least 160° C., more preferably of at least 162° C., still more preferably in the range of 163 to 170° C.

Preferably the propylene content in the first heterophasic propylene copolymer (HECO1) is 70.0 to 92.0 wt.-%, more preferably 75.0 to 90.0 wt.-%, based on the total first heterophasic propylene copolymer (HECO1), more preferably based on the amount of the polymer components of the first heterophasic propylene copolymer (HECO1), yet more preferably based on the amount of the polypropylene (PP1) and the elastomeric propylene copolymer (E1) together. The remaining part constitutes the comonomers, preferably ethylene.

According to this invention the xylene cold insoluble (XCI) fraction of the first heterophasic propylene copolymer (HECO1) represents the polypropylene (PP1) and optionally the crystalline polyethylene of the first heterophasic propylene copolymer (HECO1) whereas the elastomeric part of the first heterophasic propylene copolymer (HECO1) represents a great part of the xylene cold soluble (XCS) fraction.

Accordingly the polypropylene (PP1) content, i.e. the xylene cold insoluble (XCI) content, in the first heterophasic propylene copolymer (HECO1) is preferably in the range of 50.0 to 85.0 wt.-%, more preferably in the range of 55.0 to 80.0 wt.-%. In case polyethylene is present in the first heterophasic propylene copolymer (HECO1), the values for the polypropylene (PP1) content but not for the xylene cold insoluble (XCI) content may be a bit decreased. Thus the xylene cold soluble (XCS) content measured according to ISO 6427 of the first heterophasic propylene copolymer (HECO1) is preferably in the range of 15.0 to 50.0 wt.-%, more preferably in the range of 20.0 to 45.0 wt.-%.

The polypropylene (PP1) is preferably a random propylene copolymer (R-PP1) or a propylene homopolymer (H-PP1), the latter especially preferred.

Accordingly the comonomer content of the random polypropylene (R-PP1) is equal or below 4.0 wt.-%, yet more preferably not more than 3.0 wt.-%, still more preferably not more than 2.0 wt.-%, like not more than 1.5 wt.-%.

As mentioned above the polypropylene (PP1) is preferably a propylene homopolymer (H-PP1).

The expression propylene homopolymer used in the instant invention relates to a polypropylene that consists substantially, i.e. of more than 99.7 wt.-%, still more preferably of at least 99.8 wt.-%, of propylene units. In a preferred embodiment only propylene units in the propylene homopolymer are detectable. The comonomer content can be determined with $^{13}C$ NMR spectroscopy, as described below in the examples.

In case the polypropylene (PP1) is a random propylene copolymer (R-PP1) it is appreciated that the random propylene copolymer (R-PP1) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP1) according to this invention comprises, especially consists of, monomers copolymerizable with propylene from the group consisting of ethylene, 1-butene and 1-hexene. More specifically the random propylene copolymer (R-PP1) of this invention comprises—apart from propylene—units derivable from ethylene and/or 1-butene. In a preferred embodiment the random propylene copolymer (R-PP1) comprises units derivable from ethylene and propylene only.

Additionally it is appreciated that the random propylene copolymer (R-PP1) has preferably a comonomer content in the range of more than 0.3 to equal or less than 4.0 wt.-%, more preferably in the range of more than 0.3 to 0.8 wt.-%, yet more preferably in the range of more than 0.3 to 0.7 wt.-%.

The term "random" indicates that the comonomers of the random propylene copolymers (R-PP1) and (R-PP2) are randomly distributed within the propylene copolymers. The term random is understood according to IUPAC (Glossary of basic terms in polymer science; IUPAC recommendations 1996).

The polypropylene (PP1) of the first heterophasic propylene copolymer (HECO1), preferably the polypropylene (PP1) being the propylene homopolymer (H-PP1), can be multimodal, like bimodal, or unimodal in view of the molecular weight, the latter being preferred.

The expression "multimodal" or "bimodal" used throughout the present invention refers to the modality of the polymer, i.e.

the form of its molecular weight distribution curve, which is the graph of the molecular weight fraction as a function of its molecular weight, and/or the form of its comonomer content distribution curve, which is the graph of the comonomer content as a function of the molecular weight of the polymer fractions.

As will be explained below, the heterophasic propylene copolymers as well as their individual components (matrix and elastomeric copolymer) can be produced by blending different polymer types, i.e. of different molecular weight and/or comonomer content. However, it is preferred that the heterophasic propylene copolymers as well as their individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

Further it is appreciated that the polypropylene (PP1) of the first heterophasic propylene copolymer (HECO1) has a moderate to high melt flow $MFR_2$ (230° C.). As stated above the xylene cold insoluble (XCI) fraction of the first heterophasic propylene copolymer (HECO1) is essentially identical with the matrix of said heterophasic propylene copolymer. Accordingly the melt flow rate $MFR_2$ (230° C.) of the polypropylene (PP1) equates with the melt flow rate $MFR_2$ (230° C.) of the xylene cold insoluble (XCI) fraction of the first heterophasic propylene copolymer (HECO1). Accordingly, it is preferred that the xylene cold insoluble (XCI) fraction of the first heterophasic propylene copolymer (HECO1) has a melt flow rate $MFR_2$ (230° C.) measured according to ISO 1133 of 50 to 500 g/10 min, more preferably of 80 to 350 g/10 min, still more preferably of 120 to 300 g/10 min.

Preferably the polypropylene (PP1) is isotactic. Accordingly it is appreciated that the polypropylene matrix (PP1) has a rather high pentad concentration, i.e. higher than 80%, more preferably higher than 85%, yet more preferably higher than 90%, still more preferably higher than 92%, still yet more preferably higher than 93%, like higher than 95%.

A further characteristic of the polypropylene (PP1) is the low amount of missinsertions of propylene within the polymer chain. Accordingly the polypropylene (PP1) is preferably featured by low amount of <2,1> erythro regiodefects, i.e. of below 0.4 mol.-%, more preferably of equal or less than 0.2 mol.-%, like of equal or less than 0.1 mol.-%, determined by $^{13}$C-NMR spectroscopy.

Further it is appreciated that the polypropylene (PP1) is of linear structure and thus does not show (or nearby does not show) a kind of branching. Accordingly it is appreciated that the polypropylene (PP1) has preferably a branching index g' which is higher than the branching index g' of the high melt strength polypropylene (HMS-PP). Thus it is preferred that the polypropylene (PP1) has a branching index g' of not less than 0.9, more preferably more than 0.9, like at least 0.95. In other words if the polypropylene (PP1) has some kind of branching it shall be rather moderate. Accordingly the branching index g' of the polypropylene (PP1) is preferably in the range of 0.9 to 1.0, more preferably in the range of more than 0.9 to 1.0, like in the range of 0.96 to 1.0. In an especially preferred embodiment the polypropylene (PP1) show(s) no branching, i.e. the polypropylene (PP1) has a branching index g' of 1.0.

As the polypropylene (PP1) according to this invention is preferably of non-branched structure it does also not show a significant amount of gel content. Accordingly the polypropylene (PP1) of the present invention is featured by relatively moderate gel content, i.e. of not more than 0.50 wt.-%, more preferably of not more than 0.25 wt.-%, still more preferably of not more than 0.15 wt.-%, like below 0.15 wt.-%, yet more preferably not more than 0.10 wt.-%, determined as the relative amount of polymer insoluble in boiling xylene (xylene hot insoluble fraction, XHI). In an especially preferred embodiment no gel content is detectable.

The second component of the first heterophasic propylene copolymer (HECO1) is the elastomeric propylene copolymer (E1).

The elastomeric propylene copolymer (E1) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and at least another α-olefin selected form the group consisting of 1-butene, 1-pentene, 1-hexene, 1-heptene and 1-octene. The elastomeric propylene copolymer (E1) may additionally contain units derived from a conjugated diene, like butadiene, or a non-conjugated diene, however, it is preferred that the elastomeric propylene copolymer (E1) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. Multi-ring alicyclic fused and bridged ring dienes are also suitable including tetrahydroindene, methyltetrahydroindene, dicyclopentadiene, bicyclo (2,2,1) hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the elastomeric propylene copolymer (E1) comprises at least units derivable from propylene and ethylene and may comprise other units derivable from a further α-olefin as defined in the previous paragraph. However, it is in particular preferred that elastomeric propylene copolymer (E1) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM1) and/or an ethylene propylene rubber (EPR1) as elastomeric propylene copolymer (E1) is especially preferred, the latter most preferred.

Like the polypropylene (PP1) the elastomeric propylene copolymer (E1) can be multimodal, like bimodal, or unimodal, the latter being preferred. Concerning the definition of unimodal and multimodal, like bimodal, it is referred to the definition above.

The properties of the elastomeric propylene copolymer (E1) mainly influences the xylene cold soluble (XCS) content as well as the amorphous phase (AM) of the first heterophasic propylene copolymer (HECO1). Thus according to the present invention the amorphous phase (AM) of the xylene cold soluble (XCS) fraction of the first heterophasic propylene copolymer (HECO1) is regarded as the elastomeric propylene copolymer (E1) of the first heterophasic propylene copolymer (HECO1) when determining the comonomer content. On the other hand the xylene cold soluble (XCS) fraction is used to determine the intrinsic viscosity of the elastomeric propylene copolymer (E1).

Accordingly the propylene detectable in the amorphous phase (AM) of the xylene cold soluble (XCS) fraction ranges from 50.0 to 80.0 wt.-%, more preferably 55.0 to 75.0 wt.-%. Thus in a specific embodiment the elastomeric propylene copolymer (E1), i.e. the amorphous phase (AM) of the xylene cold soluble (XCS) fraction, comprises from 20.0 to 50.0 wt.-%, more preferably 25.0 to 45.0 wt.-%, units derivable from comonomers other than propylene, like ethylene. Preferably the elastomeric propylene copolymer (E1) is an ethylene propylene non-conjugated diene monomer polymer (EPDM1) or an ethylene propylene rubber (EPR1), the latter especially preferred, with a propylene and/or ethylene content as defined in this paragraph.

A further preferred requirement of the present invention is that the intrinsic viscosity (IV) of elastomeric propylene copolymer (E1) is moderate to high. High intrinsic viscosity (IV) values reflect a high weight average molecular weight and thus improve the impact strength. Accordingly it is appreciated that the intrinsic viscosity (IV) of the elastomeric propylene copolymer (E1), i.e. of the xylene cold soluble (XCS) fraction of the first heterophasic propylene copolymer (HECO1), is equal or more than 2.5 dl/g, more preferably at least 2.8 dl/g. On the other hand the intrinsic viscosity (IV) should be not too high otherwise the flowability is decreased. Thus the intrinsic viscosity (IV) of the elastomeric propylene copolymer (E1), i.e. of the xylene cold soluble (XCS) fraction of the first heterophasic propylene copolymer (HECO1), is preferably in the range of 2.5 to 4.5 dl/g, more preferably in the range 2.8 to 4.0 dl/g. The intrinsic viscosity (IV) is measured according to ISO 1628 in decaline at 135° C.

Preferably the first heterophasic propylene copolymer (HECO1) is α-nucleated. Accordingly it is appreciated that the first heterophasic propylene copolymer (HECO1) comprises additionally a polymeric α-nucleating agent selected from the group consisting of vinylcycloalkane polymer and/or vinylalkane polymer. The amount of polymeric a-nucleating agent within the first heterophasic propylene copolymer (HECO1) is not more than 0.05 wt.-%, preferably not more than 0.005 wt.-%.

The second heterophasic propylene copolymer (HECO2) comprises as a matrix the random propylene copolymer (R-PP2) and dispersed therein the elastomeric propylene copolymer (E2). Preferably the propylene copolymer (R-PP2) and the elastomeric propylene copolymer (E2) are the only polymer components of the second heterophasic propylene copolymer (HECO2). Only minor amounts of crystalline polyethylene as indicated above (not more than 2.5 wt.-%, like not more than 1.5 wt.-) and/or polymeric α-nucleating agent as defined below may additionally present in amounts not exceeding 1 wt.-%.

Preferably the second heterophasic propylene copolymer (HECO2) has a melt flow rate $MFR_2$ (230° C.) measured according to ISO 1133 in the range of 1 to 15 g/10 min, more preferably in the range of 2 to 12 g/10 min, like in the range of 3 to 10 g/10 min.

Preferably it is desired that the second heterophasic propylene copolymer (HECO2) is thermomechanically stable. Accordingly it is appreciated that the second heterophasic propylene copolymer (HECO2) has a melting temperature of at least 135° C., more preferably of at least 140° C., still more preferably in the range of 140 to 155° C.

Preferably the propylene content in the second heterophasic propylene copolymer (HECO2) is 70.0 to 95.0 wt.-%, more preferably 80.0 to 93.0 wt.-%, based on the total second heterophasic propylene copolymer (HECO2), more preferably based on the amount of the polymer components of the second heterophasic propylene copolymer (HECO2), yet more preferably based on the amount of the random propylene copolymer (R-PP2) and the elastomeric propylene copolymer (E2) together. The remaining part constitutes the comonomers, preferably ethylene.

According to this invention the xylene cold insoluble (XCI) fraction of the second heterophasic propylene copolymer (HECO2) represents the random propylene copolymer (R-PP2) and optionally the crystalline polyethylene of the second heterophasic propylene copolymer (HECO2) whereas the elastomeric part of the second heterophasic propylene copolymer (HECO2) represents a great part of the xylene cold soluble (XCS) fraction.

Accordingly the propylene copolymer (R-PP2) content, i.e. the xylene cold insoluble (XCI) content, in the second heterophasic propylene copolymer (HECO2) is preferably in the range of 65.0 to 90.0 wt.-%, more preferably in the range of 70.0 to 85.0 wt.-%. In case polyethylene is present in the second heterophasic propylene copolymer (HECO2), the values for the propylene copolymer (R-PP2) content but not for the xylene cold insoluble (XCI) content may be a bit decreased. Thus the xylene cold soluble (XCS) content measured according to ISO 6427 of the second heterophasic propylene copolymer (HECO2) is preferably in the range of 10.0 to 35.0 wt.-%, more preferably in the range of 15.0 to 30.0 wt.-%.

The random propylene copolymer (R-PP2) preferably comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP2) according to this invention comprises, especially consists of, monomers copolymerizable with propylene from the group consisting of ethylene, 1-butene and 1-hexene. More specifically the random propylene copolymer (R-PP2) of this invention comprises—apart from propylene—units derivable from ethylene and/or 1-butene. In a preferred embodiment the random propylene copolymer (R-PP2) comprises units derivable from ethylene and propylene only.

Additionally it is appreciated that the random propylene copolymer (R-PP2) has comonomer content of at least 0.5 wt. Accordingly it is especially preferred that the random propylene copolymer (R-PP2) has a comonomer content, preferably an ethylene content, in the range of more than 0.5 to equal or less than 5.0 wt.-%, more preferably in the range of more than 0.5 to 4.5 wt.-%, yet more preferably in the range of more than 1.0 to 4.3 wt.-%. Preferably the random propylene copolymer (R-PP2) is a random propylene-ethylene copolymer having an ethylene content in the range of more than 0.5 to equal or less than 5.0 wt.-%, more preferably in the range of more than 0.5 to 4.5 wt.-%, yet more preferably in the range of more than 1.0 to 4.3 wt.-%.

The random propylene copolymer (R-PP2) of the second heterophasic propylene copolymer (HECO2) can be multimodal, like bimodal, or unimodal in view of the molecular weight, the latter being preferred.

Further it is appreciated that the random propylene copolymer (R-PP2) of the second heterophasic propylene copolymer (HECO2) has a moderate to low melt flow $MFR_2$ (230° C.). As stated above the xylene cold insoluble (XCI) fraction of the second heterophasic propylene copolymer (HECO2) is essentially identical with the matrix of said heterophasic propylene copolymer. Accordingly the melt flow rate $MFR_2$ (230° C.) of the random propylene copolymer (R-PP2) equates with the melt flow rate $MFR_2$ (230° C.) of the xylene cold insoluble (XCI) fraction of the second heterophasic propylene copolymer (HECO2). Accordingly, it is preferred that the xylene cold insoluble (XCI) fraction of the second heterophasic propylene copolymer (HECO2) has a melt flow rate $MFR_2$ (230° C.) measured according to ISO 1133 of 1 to 40 g/10 min, more preferably of 2 to 30 g/10 min, still more preferably of 3 to 15 g/10 min.

A further characteristic of the random propylene copolymer (R-PP2) is the low amount of missinsertions of propylene within the polymer chain. Accordingly the random propylene copolymer (R-PP2) is preferably featured by low amount of <2,1> erythro regiodefects, i.e. of below 0.4 mol.-%, more preferably of equal or less than 0.2 mol.-%, like of equal or less than 0.1 mol.-%, determined by $^{13}$C-NMR spectroscopy.

Further it is appreciated that the random propylene copolymer (R-PP2) is of linear structure and thus does not show (or nearby does not show) a kind of branching. Accordingly it is appreciated that the random propylene copolymer (R-PP2) has preferably a branching index g' which is higher than the branching index g' of the high melt strength polypropylene (HMS-PP). Thus it is preferred that the random propylene copolymer (R-PP2) has a branching index g' of not less than 0.9, more preferably more than 0.9, like at least 0.95. In other words if the random propylene copolymer (R-PP2) has some kind of branching it shall be rather moderate. Accordingly the branching index g' of the random propylene copolymer (R-PP2) is preferably in the range of 0.9 to 1.0, more preferably in the range of more than 0.9 to 1.0, like in the range of 0.96 to 1.0. In an especially preferred embodiment the random propylene copolymer (R-PP2) shows no branching, i.e. the random propylene copolymer (R-PP2) has a branching index g' of 1.0.

As the random propylene copolymer (R-PP2) according to this invention is preferably of non-branched structure it does also not show a significant amount of gel content. Accordingly the random propylene copolymer (R-PP2) of the present invention is featured by relatively moderate gel content, i.e. of not more than 0.50 wt.-%, more preferably of not more than 0.25 wt.-%, still more preferably of not more than 0.15 wt.-%, like below 0.15 wt.-%, yet more preferably not more than 0.10 wt.-%, determined as the relative amount of polymer insoluble in boiling xylene (xylene hot insoluble fraction, XHI). In an especially preferred embodiment no gel content is detectable.

The second component of the second heterophasic propylene copolymer (HECO2) is the elastomeric propylene copolymer (E2).

The elastomeric propylene copolymer (E2) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and at least another α-olefin selected form the group consisting of 1-butene, 1-pentene, 1-hexene, 1-heptene and 1-octene. The elastomeric propylene copolymer (E2) may additionally contain units derived from a conjugated diene, like butadiene, or a non-conjugated diene, however, it is preferred that the elastomeric propylene copolymer (E2) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. Multi-ring alicyclic fused and bridged ring dienes are also suitable including tetrahydroindene, methyltetrahydroindene, dicyclopentadiene, bicyclo (2,2,1) hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene.

Preferred non-conjugated dienes are 5-ethylidene-2-norbornene, 1,4-hexadiene and dicyclopentadiene.

Accordingly the elastomeric propylene copolymer (E2) comprises at least units derivable from propylene and ethylene and may comprise other units derivable from a further α-olefin as defined in the previous paragraph. However, it is in particular preferred that elastomeric propylene copolymer (E2) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM2) and/or an ethylene propylene rubber (EPR2) as elastomeric propylene copolymer (E2) is especially preferred, the latter most preferred.

It is especially preferred that the elastomeric propylene copolymers (E1) and (E2) comprise the same copolymers, like for instance propylene and ethylene.

Like the random propylene copolymer (R-PP2) the elastomeric propylene copolymer (E2) can be multimodal, like bimodal, or unimodal, the latter being preferred. Concerning the definition of unimodal and multimodal, like bimodal, it is referred to the definition above.

Like for the first heterophasic propylene copolymer (HECO1), the amorphous phase (AM) of the xylene cold soluble (XCS) fraction of the second heterophasic propylene copolymer (HECO2) is regarded as the elastomeric propylene copolymer (E2) of the second heterophasic propylene copolymer (HECO2) when determining the comonomer content. On the other hand the xylene cold soluble (XCS) fraction is used to determine the intrinsic viscosity of the elastomeric propylene copolymer (E2).

Accordingly the propylene detectable in the amorphous phase (AM) of the xylene cold soluble (XCS) fraction ranges from 50.0 to 85.0 wt.-%, more preferably 60.0 to 80.0 wt.-%. Thus in a specific embodiment the elastomeric propylene copolymer (E2), i.e. the amorphous phase (AM) of the xylene cold soluble (XCS) fraction, comprises from 15.0 to 50.0 wt.-%, more preferably 20.0 to 45.0 wt.-%, units derivable from comonomers other than propylene, like ethylene. Preferably the elastomeric propylene copolymer (E2) is an ethylene propylene non-conjugated diene monomer polymer (EPDM2) or an ethylene propylene rubber (EPR2), the latter especially preferred, with a propylene and/or ethylene content as defined in this paragraph.

A further preferred requirement of the present invention is that the intrinsic viscosity (IV) of elastomeric propylene copolymer (E2) is moderate to low. Accordingly it is appreciated that the intrinsic viscosity (IV) of the elastomeric propylene copolymer (E2), i.e. of the xylene cold soluble (XCS) fraction of the second heterophasic propylene copolymer (HECO2), is equal or below than 2.4 dl/g, more preferably equal or below 2.0 dl/g. On the other hand the intrinsic viscosity (IV) should be not too low. Thus the intrinsic viscosity (IV) of the elastomeric propylene copolymer (E2), i.e. of the xylene cold soluble (XCS) fraction of the second heterophasic propylene copolymer (HECO2), is preferably in the range of 0.5 to 2.4 dl/g, more preferably in the range 1.0 to 2.0 dl/g. The intrinsic viscosity (IV) is measured according to ISO 1628 in decaline at 135° C.

In one embodiment the second heterophasic propylene copolymer (HECO2) is α-nucleated. Accordingly it is appreciated that the heterophasic propylene copolymer (HECO2) comprises additionally a polymeric α-nucleating agent selected from the group consisting of vinylcycloalkane polymer and/or vinylalkane polymer. The amount of polymeric a-nucleating agent within the second heterophasic propylene copolymer (HECO2) is not more than 0.05 wt.-%, preferably not more than 0.005 wt.-%. In another embodiment the second heterophasic propylene copolymer (HECO2) is not α-nucleated.

Additionally a polyethylene plastomer (PE) must be present in the inventive polypropylene composition. The polyethylene plastomer (PE) is (chemically) different to the elastomeric copolymers (E1) and (E2) of the heterophasic systems discussed above. More precisely the polyethylene plastomer (PE) is a linear low density polyethylene (LLDPE).

Accordingly the linear low density polyethylene (LLDPE) has preferably a density measured according to ISO 1183-187 in the range 820 to 920 kg/m³, more preferably in the range of 840 to 900 kg/m³, Preferably the polyethylene plastomer (PE), i.e. the linear low density polyethylene (LLDPE), is featured by a specific melt flow rate, namely by a melt flow rate $MFR_2$ (190° C.) measured according to ISO 1133 in the range of 0.5 to 40.0 g/10 min, more preferably in the range of 0.5 to 30.0 g/10 min.

In a preferred embodiment the polyethylene plastomer (PE), i.e. the linear low density polyethylene (LLDPE), is a copolymer containing as a major part units derivable from ethylene. Accordingly it is appreciated that the polyethylene plastomer (PE), i.e. the linear low density polyethylene (LLDPE), comprises at least 50.0 wt.-% units derivable from ethylene, more preferably at least 55.0 wt.-% of units derived from ethylene. Thus it is appreciated that the polyethylene plastomer (PE), i.e. the linear low density polyethylene (LLDPE), comprises 50.0 to 70.0 wt.-%, more preferably 55.0 to 65 wt.-%, units derivable from ethylene. The comonomers present in the polyethylene plastomer (PE), i.e. the linear low density polyethylene (LLDPE), are $C_4$ to $C_{20}$ α-olefins, like 1-butene, 1-hexene and 1-octene, the latter especially preferred. Accordingly in one specific embodiment the polyethylene plastomer (PE), i.e. the linear low density polyethylene (LLDPE), is an ethylene-1-octene polymer with the amounts given in this paragraph.

Further the instant composition must comprise a mineral filler (F), preferably an anisotropic mineral filler (F). Accordingly the mineral filler is preferably selected from the group consisting of talc, mica and wollastonite. Most preferably the mineral filler (F) is talc.

It is appreciated that the mineral filler (F) has a median particle size d50 [mass percent] determined by sedimentation technique of equal or more than 0.5 µm, more preferably of equal or more than 0.8 µm, like equal or more than 1.0 µm, yet more preferably in the range of 0.8 to 5.0 µm, still more preferably in the range of 1.0 to 4.0 µm.

Alternatively or additionally the mineral filler (F) has a cutoff particle size d95 [mass percent] determined by sedimentation technique of equal or more than 1.5 µm, like equal or more than 2.0 µm, more preferably of equal or more than 3.0 µm, yet more preferably in the range of 1.5 to 20.0 µm, like in the range of 3.0 to 14.0 µm.

It is in particular appreciated that the mineral filler (F) is featured by a high aspect ratio. In the present application the lamellarity index (LI) is used to express the aspect ratio, as the lamellarity index (LI) characterizes the flatness (large dimension/thickness) of a mineral filler (F). The lamellarity index (LI) is defined throughout the present invention by formula (I)

$$\frac{d50\,(L) - d50\,(S)}{d50\,(S)} \quad (I)$$

wherein
d50 (L) is the median particle size d50 [mass percent] determined by laser diffraction technique, and
d50 (S) is the median particle size d50 [mass percent] determined by sedimentation technique.

Accordingly the lamellarity index (LI) of the mineral filler (F) is more than 2.00, like more than 2.50, more preferably of at least 3.10, yet more preferably of at least 3.50, still more preferably of at least 3.90, still yet more preferably in the range of 2.00 to 9.00, like 4.00 to 7.00.

Moreover it is appreciated that the mineral filler (F) has a rather high specific surface area. Accordingly it is appreciated that the particle size measured according to DIN 66131/2 of the mineral filler (F) is equal or more than 10 m²/g, more preferably in the range of 12.0 to 22.0 m²/g, like in the range of 14.0 to 20.0 m²/g.

Finally the instant polypropylene composition comprises an α-nucleating agent (NA).

In principle any α-nucleating agent (NA) can be used. However it is preferred that the α-nucleating agent (NA) is selected from the group consisting of
(a) salts of monocarboxylic acids and polycarboxylic acids, e.g. sodium benzoate or aluminum tert-butylbenzoate,
(b) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol),
(c) substituted nonitol-derivatives, such as 1,2,3,-trideoxy-4, 6:5,7-bis-O-[(4-propylphenyl)methylene]-nonitol,
(d) salts of diesters of phosphoric acid, e.g. sodium 2,2'-methylenebis (4, 6,-di-tert-butylphenyl)phosphate or aluminium-hydroxy-bis[2,2'-methylene-bis(4,6-di-t-butylphenyl)phosphate], like aluminium-hydroxy-bis[2,2'-methylene-bis(4,6-di-tert-butylphenyl)phosphate] and Li-myristate (NA21),
(e) trisamide-benzene derivatives, like N-[3,5-bis-(2,2-dimethyl-propionylamino)-phenyl]-2,2-dimethyl-propionamide, and
(f) mixtures thereof.

Especially good results are achievable in case the instant polypropylene composition comprises
(a) 40 to 70 wt.-%, more preferably 45 to 60 wt.-%, of the first heterophasic propylene copolymer (HECO1),
(b) 10 to 40 wt.-%, more preferably 15 to 30 wt.-%, of the second heterophasic propylene copolymer (HECO2)
(c) 1 to 10 wt.-%, more preferably 4 to 10 wt.-%, of the high melt strength polypropylene (HMS-PP),
(d) 1 to 10 wt.-%, more preferably 4 to 10 wt.-%, of the polyethylene plastomer (PE),
(e) 5 to 30 wt.-% of the mineral filler (F), more preferably 10 to 25 wt.-%, and
(f) optionally 0.0005 to 1.0 wt.-%, more preferably 0.001 to 0.5 wt.-%, of the nucleating agent (NA).

All components used for the preparation of the instant composition are known. Accordingly also their preparation is well known. For instance the heterophasic polypropylenes (HECO1) and (HECO2) according to this invention are preferably produced in a multistage process known in the art, wherein the matrix is produced at least in one slurry reactor and subsequently the elastomeric copolymer is produced at least in one gas phase reactor.

Thus, the polymerization system can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerization with the chosen catalyst system, as described in detail below.

For the preparation of the first heterophasic propylene copolymer (HECO1) and second heterophasic propylene copolymer (HECO2) a catalyst system comprising a Ziegler-Natta procatalyst, an external donor and a cocatalyst as defined below is used.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 msec.

The particularly preferred embodiment for the preparation of the heterophasic polypropylenes of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably the first heterophasic polypropylene composition (HECO1) and the second heterophasic polypropylene composition (HECO2) are produced in the Spheripol® or in the Borstar®-PP process.

One preferred multistage process may therefore comprise the steps of:
producing a polypropylene matrix in the presence of a suitable catalyst system, as for instance described in detail below, in a first slurry reactor and optionally in a second slurry reactor, both slurry reactors using the same polymerization conditions,
transferring the slurry reactor product into at least one first gas phase reactor, like one gas phase reactor or a first and a second gas phase reactor connected in series,
producing an elastomeric copolymer in the presence of the polypropylene matrix and in the presence of the catalyst system in said at least first gas phase reactor,
recovering the polymer product for further processing.

With respect to the above-mentioned preferred slurry-gas phase process, the following general information can be provided with respect to the process conditions.

Temperature is preferably from 40 to 110° C., preferably between 50 and 100° C., in particular between 60 and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the first heterophasic propylene copolymer (HECO1) is preferably obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

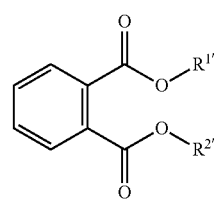

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanised carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

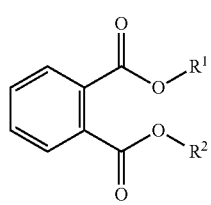
(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

In addition to the special Ziegler-Natta procatalyst an organometallic cocatalyst as component (ii) is used.

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used for the preparation of the first heterophasic propylene copolymer is an external donor represented by formula (III). Formula (III) is defined by $$Si(OCH_2CH_3)_3(NR^xR^y) \qquad (III)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert-butyl, tert-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

Most preferably the external donor of formula (IIIb) is diethylaminotriethoxysilane. This external donor has been used preferably for the first heterophasic propylene copolymer (HECO1).

Still more preferably the catalyst used according to the invention is the BC-1 catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and a cocatalyst, which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic polypropylene composition according to this invention. The polymerized vinyl compound can act as an α-nucleating agent. This modification is in particular used for the preparation of the first heterophasic propylene copolymer (HECO1).

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

According to the invention the second heterophasic propylene copolymer (HECO2) is preferably obtained by a multistage polymerization process, as described above, in the presence of a so called high yield Ziegler-Natta olefin polymerization catalyst comprising a component in the form of particles having a predetermined size range which has been produced in a process comprising:
a) preparing a solution of a complex of a Group 2 metal and an electron donor by reacting a compound of said metal with said electron donor or a precursor thereof in an organic liquid reaction medium,
b) reacting said complex in solution with a compound of a transition metal, preferably of any of groups 4-6, to produce an emulsion the dispersed phase of which containing more than 50 mol % of the Group 2 metal in said complex.
c) maintaining the particles of said dispersed phase within the average size range of 5 to 200 micrometers, preferably 10 to 100 micrometers, even more preferably 20 to 50 micrometers by agitation in the presence of an emulsion stabilizer and
d) solidifying said particles, and recovering, optionally washing said particles to obtain said catalyst component.

The group 2 metal used in the preparation of the catalyst is preferably magnesium and the liquid organic medium for reacting the group 2 metal compound preferably comprises a $C_6$-$C_{10}$ aromatic hydrocarbon, preferably toluene.

An electron donor compound to be reacted with the group 2 metal compound preferably is a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferably dioctyl phthalate or bis-(2-ethylhexyl)phthalate. The reaction for the preparation of the group 2 metal complex is generally carried out at a temperature of 20 to 80° C., and in case that the group 2 metal is magnesium, the preparation of the magnesium complex may advantageously be carried out at a temperature of 50 to 70° C.

The compound of a group 4-6 metal is preferably a compound of a group 4 metal. The group 4 metal is preferably titanium, and its compound to be reacted with the complex of a group 2 metal is preferably a halide.

In a still further embodiment of the invention, the compound of a group 4-6 metal can also be selected from group 5 and group 6 metals, such as Cu, Fe, Co, Ni and/or Pd compounds. In a preferred embodiment of the production process of the catalyst a turbulence minimizing agent (TMA) is added to the reaction mixture before solidifying said particles of the dispersed phase, the TMA being inert and soluble in the reaction mixture under reaction conditions.

The turbulence minimizing agent (TMA) or mixtures thereof are preferably polymers having linear aliphatic carbon backbone chains, which might be branched with only short side chains in order to serve for uniform flow conditions when stirring. Said TMA is in particular preferably selected from alpha-olefin polymers having a high molecular weight Mw (as measured by gel permeation chromatography) of about 1 to $40 \times 10^6$, or mixtures thereof. Especially preferred are polymers of alpha-olefin monomers with 6 to 20 carbon atoms, and more preferably polyoctene, polynonene, polydecene, polyundecene or polydodecene or mixtures thereof, having the molecular weight and general backbone structure as defined before. Most preferably the TMA is polydecene.

Usually, said turbulence minimizing agent can be added in any process step before particle formation starts, i.e. at the latest before solidification of the emulsion, and is added to the emulsion in an amount of 1 to 1000 ppm, preferably 5 to 100 ppm and more preferably 5 to 50 ppm, based on the total weight of the reaction mixture.

A preferred embodiment of the process for producing catalysts for preparing propylene homo- or random copolymers of the present invention comprises: preparing a solution of a magnesium complex by reacting alkoxy magnesium compound and an electron donor or precursor thereof in a $C_6$-$C_{10}$ aromatic liquid reaction medium comprising $C_6$-$C_{10}$ aromatic hydrocarbon or a mixture of $C_6$-$C_{10}$ aromatic hydrocarbon and $C_5$-$C_9$ aliphatic hydrocarbon; reacting said magnesium complex with a compound of at least one fourvalent group 4 metal at a temperature greater than 10° C. and less than 60° C., to produce an emulsion of a denser, $TiCl_4$/toluene-insoluble, oil dispersed phase having a group 4 metal/Mg mol ratio of 0.1 to 10 in an oil disperse phase having a group 4 metal/Mg mol ratio of 10 to 100; maintaining the droplets of said dispersed phase within the size range of 5 to 200 micrometers by agitation in the presence of an emulsion stabilizer while heating the emulsion to solidify said droplets and adding turbulence minimizing agent into the reaction mixture before solidifying said droplets of the dispersed phase, said turbulence minimizing agent being inert and soluble in the reaction mixture under reaction conditions; and solidifying said particles of the dispersed phase by heating and recovering the obtained catalyst particles.

The said disperse and dispersed phases are thus distinguishable from one another by the fact that the denser oil, if contacted with a solution of titanium tetrachloride in toluene, will not dissolve in it. A suitable $TiCl_4$/toluene solution for establishing this criterion would be one having a $TiCl_4$/toluene mol ratio of 0.1 to 0.3. The disperse and dispersed phase are also distinguishable by the fact that the great preponderance of the Mg provided (as complex) for the reaction with the group 4 metal compound is present in the dispersed phase, as revealed by comparison of the respective group 4 metal/Mg mol ratios.

In effect, therefore, virtually the entirety of the reaction product of the Mg complex with the group 4 metal, which is the precursor of the final catalyst, becomes the dispersed phase, and proceeds through further processing steps to the final dry particulate form. The disperse phase, still containing a useful quantity of group 4 metal, can be reprocessed for recovery of that metal.

The production of a two-phase, rather than a single phase reaction product is encouraged by carrying out the Mg complex/group 4 metal compound reaction at low temperature, specifically above 10° C. but below 60° C., preferably between 20 and 50° C. Since the two phases will naturally tent to separate into a lower, denser phase and a supernatant lighter phase, it is necessary to maintain the reaction product as an emulsion by agitation, preferably in the presence of an emulsion stabilizer.

The resulting particles from the dispersed phase of the emulsion are of a size, shape (spherical) and uniformity which render the final catalyst extremely effective in olefin polymerization. This morphology is preserved during the heating to solidify the particles, and of course throughout the final washing and drying steps. It is, by contrast, difficult to the point of impossibility to achieve such morphology through precipitation, because of the fundamental uncontrollability of nucleation and growth, and the large number of variables which affect these events.

The electron donor is preferably an aromatic carboxylic acid ester, particularly favored esters being dioctyl phthalate and bis-(2-ethylhexyl)phthalate. The donor may conveniently be formed in situ by reaction of an aromatic carboxylic acid chloride precursor with a $C_2$-$C_{16}$ alkanol and/or diol. The liquid medium preferably comprises toluene.

Furthermore, emulsifying agents/emulsion stabilizers can be used additionally in a manner known in the art for facilitating the formation and/or stability of the emulsion. For said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particularly preferred are unbranched $C_{12}$ to $C_{20}$ acrylates such as poly(hexadecyl)-metacrylate and poly(octadecyl)-metacrylate.

It has been found that the best results are obtained when the group 4 metal/Mg mol ratio of the denser oil is 1 to 5, preferably 2 to 4, and that of the disperse phase oil is 55 to 65. Generally, the ratio of the mol ratio of group 4 metal/Mg in the disperse phase oil to that in the denser oil is at least 10.

Solidification of the dispersed phase droplets by heating is suitably carried out at a temperature of 70 to 150° C., usually at 90 to 110° C.

The finally obtained catalyst is desirably in the form of particles having average size ranges of 5 to 200 micrometers, preferably 10 to 100 micrometers, more preferably 20 to 50 micrometers.

The reagents can be added to the aromatic reaction medium in any order. However, it is preferred that in a first step the alkoxy magnesium compound is reacted with a carboxylic acid halide precursor of the electron donor to form an intermediate; and in a second step the obtained product is further reacted with the group 4 metal. The magnesium compound preferably contains from 1 to 20 carbon atoms per alkoxy group, and the carboxyl acid should contain at least 8 carbon atoms.

Reaction of the magnesium compound, carboxylic acid halide and alcohol proceeds satisfactorily at temperatures in the range of 20 to 80° C., preferably 50 to 70° C. The product of that reaction, the "Mg complex", is reacted with the group 4 metal compound at a lower temperature, to bring about the formation of a two-phase, oil-in-oil, product.

The reaction medium used as solvent can be aromatic or a mixture of aromatic and aliphatic hydrocarbons, the latter one containing preferably 5 to 9 carbon atoms, more preferably 5 to 7 carbon atoms, or mixtures thereof. Preferably, the liquid reaction medium used as solvent in the reaction is aromatic and is more preferably selected from hydrocarbons such as substituted and unsubstituted benzenes, preferably from alkylated benzenes, even more preferably from toluene and the xylenes, and most preferably being toluene. The molar ratio of said aromatic medium to magnesium is preferably less than 10, for instance from 4 to 10, preferably from 5 to 9.

The alkoxy magnesium compound group is preferably selected from the group consisting of magnesium dialkoxides, complexes of magnesium dihalide and an alcohol, and complexes of a magnesium dihalide and a magnesium dialkoxide. It may be a reaction product of an alcohol and a magnesium compound selected from the group consisting of dialkyl magnesium, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides, and alkyl magnesium aryloxides.

The magnesium dialkoxide may be the reaction product of a magnesium dihalide such as magnesium dichloride or a dialkyl magnesium of the formula $R'_x R''_y Mg$, wherein x+y=2 and x and y are in the range of 0.3 to 1.7 and each one of R' and R" is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Preferably R' is a butyl group and R" is an octyl group, i.e. the dialkyl magnesium compound is butyloctyl magnesium, most preferably the dialkyl magnesium compound is $Mg[(Bu)_{1.5}(Oct)_{0.5}]$.

Dialkyl magnesium, alkyl magnesium alkoxide or magnesium dihalide can react with a polyhydric alcohol $R(OH)_m$, with m being in the range of 2-4, or a monohydric alcohol ROH or mixtures thereof.

Typical $C_2$ to $C_6$ polyhydric alcohol may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentaerythritol.

The aromatic reaction medium may also contain a monohydric alcohol, which may be straight or branched chain. Typical $C_1$-$C_5$ monohydric alcohols are methanol, ethanol, n-propanol, iso-propanol, n-butanol, iso-butanol, sec. butanol, tert. butanol, n-amyl alcohol, iso-amyl alcohol, sec. amyl alcohol, tert. amyl alcohol, diethyl carbinol, akt. amyl alcohol, sec. isoamyl alcohol, tert. butyl carbinol. Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol, and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, n-1-hexadecanol, n–1-heptadecanol, and n–1-octadecanol. The monohydric alcohols may be unsaturated, as long as they do not act as catalyst poisons.

Preferable monohydric alcohols are those of formula ROH in which R is a $C_2$-$C_{16}$ alkyl group, most preferably a $C_4$-$C_{12}$ alkyl group, particularly 2-ethyl-1-hexanol or 1-octanol. Preferably, essentially all of the aromatic carboxylic acid ester is a reaction product of a carboxylic acid halide, preferably a dicarboxylic acid dihalide, more preferably an unsaturated dicarboxylic acid dihalide, most preferably phthalic acid dichloride, with the monohydric alcohol.

The compound of a fourvalent group 4 metal containing a halogen is preferably a titanium tetrahalide. Equivalent to titanium tetrahalide is the combination of an alkoxy titanium halide and a halogenation agent, which are able to form a titanium tetrahalide in situ. The most preferred halide is the chloride.

As is known, the addition of the at least one halogenated hydrocarbon during the catalyst preparation process can lead to further improved catalytic activity. Reactive halogenated hydrocarbons preferably have the formula $R'''X'''_n$, wherein R''' is a $C_1$-$C_{20}$ hydrocarbyl group, particularly a $C_1$-$C_{10}$ aliphatic hydrocarbyl group, X''' is a halogen, preferably chlorine, and n is an integer from 1 to 4.

Such chlorinated hydrocarbons include monochloromethane, dichloromethane, trichloromethane (chloroform), tetrachloromethane, monochloroethane, (1,1)-dichloroethane, (1,1)-dichloroethane, (1,1,1)-trichloroethane, (1,1,2)-trichloroethane, (1,1,1,2)-tetrachlororethane, (1,1,2,2)-tetrachloroethane, pentachloroethane, hexachloroethane, 1-chloropropane, 2-chloropropane, (1,2)-dichloropropane, (1,3)-dichloropropane, (1,2,3)-trichloropropane, 1-chlorobutane, 2-chlorobutane, isobutyl chloride, tert. butyl chloride, (1,4)-dichlorobutane, 1-chloropentane, and (1,5)-dichloropentane. The chlorinated hydrocarbons may also be unsaturated, provided that the unsaturation does not act as catalyst poison in the final catalyst.

In the above formula, R''' is preferably a $C_1$-$C_{10}$ alkyl group, X''' is preferably chlorine and n is preferably 1 or 2. Preferred compounds include butyl chloride (BuCl), dichloroalkanes such as (1,4)-dichlorobutane, and tertiary butyl chloride.

The catalyst preparation as described herein can be carried out batchwise, semi-continuously or continuously. In such a semi-continuous or continuous process, the solution of the complex of the group 2 metal and said electron donor, which is prepared by reacting the compound of said metal with said electron donor in an organic liquid reaction medium, is mixed with at least one compound of a transition metal which might be solved in the same or different organic liquid reaction medium. The so obtained solution is then agitated, possibly in the presence of an emulsion stabilizer, and then the agitated emulsion is fed into a temperature gradient reactor, in which the emulsion is subjected to a temperature gradient, thus leading to solidifying the droplets of a dispersed phase of the emulsion. The TMA is preferably contained in the solution of the complex or added to the solution before feeding the agitated solution to the temperature gradient reactor.

When feeding said agitated emulsion to the temperature gradient reactor, an inert solvent, in which the droplets are not soluble, can additionally be fed into that gradient reactor in order to improve that droplet formation and thus leading to a uniform grain size of the particles of the catalyst, which are formed in the temperature gradient reactor when passing through said line. Such additional solvent might be the same as the organic liquid reaction medium, which is used for preparing the solution of the complex of the group 2 metal as explained above in more detail.

The solidified particles of the catalyst can subsequently be recovered by an in-stream filtering unit and are preferably subjected to washing in order to remove unreacted starting components.

The recovered particulate product is washed at least once, preferably at least twice, most preferably at least three times with a hydrocarbon, which is preferably selected from aromatic and aliphatic hydrocarbons, preferably with toluene, particularly with hot (e.g. 90° C.) toluene, which may include a small amount, preferably about 0.01-10 vol % of $TiCl_4$ or an alkyl aluminium chloride, such as diethyl aluminium chloride (DEAC), in it. A further washing step is advantageous performed with heptane, most preferably with hot (e.g. 90° C.) heptane, and a still further washing step with pentane. A washing step typically includes several substeps. A favored washing sequence is, for example, one washing step with toluene at 90° C., two washing steps with heptane at 90° C. and one or two washing steps with pentane at room temperature.

Finally, the washed catalyst is dried, e.g. by evaporation or flushing with nitrogen.

After washing and drying the catalyst can be stored for further use or can be subjected to further treatment steps or can immediately be fed to a polymerization reactor.

The catalyst system which is used according to the present invention also comprises an aluminium alkyl compound, preferably of the general formula $AlR_{3-n}X_n$ wherein R stands for straight chain or branched alkyl group having 1 to 20, preferably 1 to 10 and more preferably 1 to 6 carbon atoms, X stands for halogen and n stands for 0, 1, 2 or 3, which aluminium alkyl compound is added, and brought into contact with the droplets of the dispersed phase of the agitated emulsion before recovering the solidified particles of the catalyst.

It is further preferred that at least a part of the aluminium compound is added, in pure form or in the form of a solution, from shortly before the beginning of the emulsion formation until adding it to the washing liquid, e.g. toluene, in such an amount that the final Al content of the particles is from 0.05 to 1 wt %, preferably 0.1 to 0.8 wt % and most preferably 0.2 to 0.7 wt %. by weight of the final catalyst particles. The most preferred Al content may vary depending upon the type of the Al compound and on the adding step. For example, in some cases the most preferred amount may be 0.1 to 0.4 wt %.

Still further, preferably tri-($C_1$-$C_6$)-alkyl aluminium compounds are used, tiethylaluminium being most preferred.

In Ziegler-Natta catalysts alumimium alkyl compounds are used as cocatalysts, i.e. for activating the catalyst. During activation of polypropylene catalysts, alkyl aluminium does not only reduce and alkylate the actice metal, but it has also influence on the donor composition. It is well-known that alkyl aluminium compounds can remove carboxylic acid esters, which are used as internal donors. Simultaneously, external donors can be fixed on the catalyst. Typically, triethyl aluminium (TEAl) is used as cocatalyst and silanes as external donors as is disclosed e.g. in articles Sacci, M. C.; Forlini, F.; Tritto, I. and Locatelli, P., Macromolecules, 1996, 29, 3341-3345 and Sacci, M. C.; Tritto, I.; Shan, C. and Mendichi, R., Macromolecules, 1991, 24, 6823-6826.

In the catalysts used in the present invention, the internal donor, preferably bis-(2-ethylhexyl)phthalate (DOP), can be significantly extracted from the catalyst with the use of the alkyl aluminium compound. The extraction level is dependent on the concentration of the aluminium alkyl. The higher the concentration, the more of the internal donor can be extracted. Further, the addition of the external donor together with aluminium alkyl improves the donor exchange. The longer the reaction time is, the more external donor is bound on the catalyst.

Particularly preferred external donors are any of the following: cyclohexyl methyl dimethyloxysilane, dicyclopentyl dimethoxysilane, diisopropyl dimethoxysilane, di-isobutyl dimethoxysilane and di-tert.-butyl dimethoxysilane. Most preferred are cyclohexyl methyl dimethoxysilane and dicyclopentyl dimethoxysilane, cyclohexyl methyl dimethoxysilane being particularly preferred. Especially preferred are dicyclopentyl dimethoxy silane [$Si(OCH_3)_2(cyclo$-$pentyl)_2$] and diisopropyl dimethoxy silane [$Si(OCH_3)_2(CH(CH_3)_2)_2$].

It is preferred that a solution containing alkyl aluminium and external donor in an organic solvent, e.g. pentane, are added to the catalyst after solidification of the catalyst particles. The catalyst which is obtained by the above described process is a non-supported Ziegler-Nana catalyst. Non-supported catalysts do not use any external carrier, contrary to conventional catalysts, e.g. conventional Ziegler-Natta catalysts, which are e.g. supported on silica or $MgCl_2$.

Further preferred embodiments of the catalyst system production include all preferred embodiments as described in WO 03/000754.

The high melt strength polypropylene (HMS-PP) is preferably obtained by a process as described in EP 0 879 830 A1 and EP 0 890 612 A2. Both documents are herewith included by reference. Accordingly the high melt strength polypropylene (HMS-PP) is produced by
(a) mixing
   (i) a unmodified propylene homopolymer and/or copolymer (A) as defined above, preferably a unmodified propylene homopolymer with a weight average molecular weight ($M_w$) of 500,000 to 1,500,000 g/mol,
   (ii) from 0.05 to 3 wt.-% based on the components of (i) and (ii), of a peroxide selected from the group consisting of acyl peroxide, alkyl peroxide, hydroperoxide, perester and peroxycarbonate, and
   (iii) optionally diluted with inert solvents,
(b) heating to 30 to 100° C., preferably to 60 to 90° C.,
(c) sorption of volatile bifunctional monomers, preferably ethylenically unsaturated, multifunctional monomers, like $C_4$ to $C_{10}$ dienes and/or $C_7$ to $C_{10}$ divinyl compounds, by the unmodified propylene homopolymer and/or copolymer (A), preferably unmodified propylene homopolymer (A), from the gas phase at a temperature of from 20 to 120° C., preferably of from 60 to 100° C., where the amount of the absorbed bifunctionally unsaturated monomers is from 0.01 to 10.00 wt.-%, preferably from 0.05 to 2.00 wt.-%, based on the propylene homopolymer (A),
(d) heating and melting the polypropylene composition in an atmosphere comprising inert gas and/or the volatile bifunctional monomers, from sorption temperature to 210° C., whereupon the free-radical generators are decomposed and then
(e) heating the melt up to 280° C. in order to remove unreacted monomers and decomposition products, and
(f) pelletizing the melt.

The process for producing the high melt strength polypropylene (HMS-PP) preferably is a continuous method, performed in continuous reactors, mixers, kneaders and extruders. Batchwise production of the high melt strength polypropylene (HMS-PP), however is feasible as well.

Practical sorption times τ of the volatile bifunctional monomers range from 10 to 1000 s, where sorption times τ of 60 to 600 are preferred.

For mixing the individual components of the instant composition, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection moulding to generate articles and products of the inventive composition.

Accordingly the present invention is also directed to a process for the preparation of the instant composition comprising the steps of adding the first heterophasic propylene copolymer (HECO1), the second heterophasic propylene copolymer (HECO2), the high melt strength polypropylene (HMS-PP), the polyethylene plastomer (PE), the mineral filler (F), and optionally the α-nucleating agent (NA) and/or other common additives (as for instance antioxidants) to an extruder and extruding the same obtaining thereby said composition.

The composition according to the invention may be pelletized and compounded using any of the variety of compounding and blending methods well known and commonly used in the resin compounding art.

The composition of the present invention is preferably used for the production of automotive articles, like moulded automotive articles, preferably automotive injection moulded articles. Even more preferred is the use for the production of car interiors and exteriors, like bumpers, side trims, step assists, body panels, spoilers, dashboards, interior trims and the like.

The current invention also provides (automotive) articles, like injection molded articles, comprising at least to 60 wt.-%, more preferably at least 80 wt.-%, yet more preferably at least 95 wt.-%, like consisting, of the inventive polypropylene composition. Accordingly the present invention is especially directed to automotive articles, especially to car interiors and exteriors, like bumpers, side trims, step assists, body panels, spoilers, dashboards, interior trims and the like, comprising at least to 60 wt.-%, more preferably at least 80 wt.-%, yet more preferably at least 95 wt.-%, like consisting, of the inventive polypropylene composition.

The present invention will now be described in further detail by the examples provided below.

EXAMPLES

A. Measuring methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra For ethylene-propylene copolymers approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra.

Quantitative $^{13}C\{^1H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e} = (I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

[21e] mol %=100*($P_{21e}/P_{total}$)

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

E [mol %]=100*fE

The weight percent comonomer incorporation in the polymer was calculated from the mole fraction according to:

E [wt %]=100*(fE*28.05)/((fE*28.05)+((1−fE)*42.08))

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

XXX [mol %]=100*fXXX

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

fXEX=fEEE+fPEE+fPEP fXPX=fPPP+fEPP+fEPE where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

R(E)[%]=100*(fPEP/fXEX)

Molecular Weight Averages, Molecular Weight Distribution, Branching Index (Mn, Mw, MWD, g') Determined by SEC/VISC-LS Molecular weight averages (Mw, Mn), molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Polymer Laboratories as stationary phase and 1,2,4-trichlorobenzene (TCB, stabilized with 250 mg/L 2,6-Di tert butyl-4-methylphenol) as mobile phase at 160° C. and at a constant flow rate of 1 mL/min was applied. 200 μL of sample solution were injected per analysis. The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm$^3$/g.

The molar mass at each elution slice was determined by light scattering using a combination of two angels 15° and 90°. All data processing and calculation was performed using the Cirrus Multi-Offline SEC-Software Version 3.2 (Polymer Laboratories a Varian inc. Company). The molecular weight was calculated using the option in the Cirrus software "use combination of LS angles" in the field "sample calculation options subfield slice MW data from".

The data processing is described in details in G. Saunders, P. A. G: Cormack, S. Graham; D. C. Sherrington, Macromolecules, 2005, 38, 6418-6422. Therein the $Mw_i$ at each slice is determined by the 90° angle by the following equation:

$$Mw_i = \frac{K_{LS} * R(\theta)^{90°}}{\frac{dn}{dc} * R * P(\theta)}$$

The Rayleigh ratio $R(\theta)^{90°}$ of the 90° angle is measured by the LS detector and R is the response of the RI-detector. The particle scatter function $P(\theta)$ is determined by the usage of both angles (15° and 90°) as described by C. Jackson and H. G. Barth (C. Jackson and H. G. Barth, "Molecular Weight Sensitive Detectors" in Handbook of Size Exclusion Chromatography and related techniques, C.-S. Wu, 2$^{nd}$ ed., Marcel Dekker, New York, 2004, p. 103). For the low and high molecular region in which less signal of the LS detector or RI detector respectively was achieved a linear fit was used to correlate the elution volume to the corresponding molecular weight.

The dn/dc used in the equation is calculated from the detector constant of the RI detector, the concentration c of the sample and the area of the detector response of the analysed sample. The relative amount of branching is determined using the g'-index of the branched polymer sample. The long chain branching (LCB) index is defined as g'=$[\eta]_{br}/[\eta]_{lin}$. It is well known if the g' value increases the branching content decreases. $[\eta]$ is the intrinsic viscosity at 160° C. in trichlorobenzene of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector. $[\eta]_{lin}$ is the intrinsic viscosity of a linear sample and $[\eta]_{br}$ the viscosity of a branched sample of the same molecular weight and chemical composition. The number average of g'$_n$ and the weight average g'$_w$ are defined as:

$$g'_n = \frac{\Sigma_0^i a_i * \frac{[\eta]_{br,i}}{[\eta]_{lin,i}}}{\Sigma a_i}$$

$$g'_w = \frac{\Sigma_0^i A_i * \frac{[\eta]_{br,i}}{[\eta]_{lin,i}}}{\Sigma_0^i A_i * \left(\frac{[\eta]_{br,i}}{[\eta]_{lin,i}}\right)^2}$$

where $a_i$ is dW/d log M of fraction i and $A_i$ is the cumulative dW/d log M of the polymer up to fraction i. The $[\eta]_{lin}$ of the linear reference (linear isotactic PP) over the molecular weight was measured with an online viscosity detector. Following K and α values were obtained (K=30.68*10$^{-3}$ and α=0.681) from the linear reference in the molecular weight range of log M=4.5-6.1. The $[\eta]_{lin}$ per slice molecular weight for the g' calculations was calculated by following relationship $[\eta]_{lin,i}$=K*$M_i^α$. $[\eta]_{br,i}$ was measured for each particular sample by online viscosity and concentration detector.

Strain Hardening Behaviour (Melt Strength):

The strain hardening behaviour is determined by the method as described in the article "Rheotens-Mastercurves and Drawability of Polymer Melts", M. H. Wagner, Polymer Engineering and Sience, MID-APRIL 1SW, Vol. 36, NO. 7, pages 925 to 935. The content of the document is included by reference.

For detailed explanation of the measuring method it is also referred to the FIG. 1.

FIG. 1 shows a schematic representation of the experimental procedure which is used to determine strain hardening.

The strain hardening behaviour of polymers is analysed by Rheotens apparatus (1) (product of Göttfert, Siemensstr.2, 74711 Buchen, Germany) in which a melt strand (2) is elongated by drawing down with a defined acceleration. The haul-off force F in dependence of draw-down velocity v is recorded.

The test procedure is performed in a standard conditioned room with controlled room temperature of 23° C. and 1 atm. The Rheotens apparatus (1) is combined with an extruder/melt pump (3) for continuous feeding of the melt strand (2). The extrusion temperature is 200° C.; a capillary die with a diameter of 2 mm and a length of 6 mm is used. The strength length between the capillary die and the Rheotens wheels is 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand (2) drawn down is 120 mm/sec$^2$.

The Rheotens was operated in combination with the PC program EXTENS. This is a real-time data-acquisition program, which displays and stores the measured data of tensile force and drawdown speed.

The schematic diagram in FIG. 1 shows in an exemplary fashion the measured increase in haul-off force F (i.e. "melt strength") versus the increase in draw-down velocity v (i.e. "drawability").

Density is measured according to ISO 1183-187. Sample preparation is done by compression moulding in accordance with ISO 1872-2:2007.

MFR$_2$ (230° C.) is measured according to ISO 1133 (230° C., 2.16 kg load).

MFR$_2$ (190° C.) is measured according to ISO 1133 (190° C., 2.16 kg load).

Xylene Cold Soluble Fraction (XCS Wt.-%) and Xylene Cold Insoluble Faction (XCI Wt.-%)

The xylene cold soluble fraction (XCS) is determined at 23° C. according to ISO 6427. The fraction insoluble under such conditions is specified as xylene cold insoluble faction (XCI).

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

The amorphous content (AM) is measured by separating the above xylene cold soluble fraction (XCS) and precipitating the amorphous part with acetone. The precipitate was filtered and dried in a vacuum oven at 90° C.

$$AM\% = \frac{100 \times m1 \times v0}{m0 \times v1}$$

wherein

"AM %" is the amorphous fraction,
"m0" is initial polymer amount (g)
"m1" is weight of precipitate (g)
"v0" is initial volume (ml)
"v1" is volume of analyzed sample (ml)

Intrinsic viscosity is measured according to DIN ISO 1628/1, October 1999 (in Decalin at 135° C.).

Melting temperature (T$_m$) and heat of fusion (H$_f$), crystallization temperature (T$_c$ and heat of crystallization (H$_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization (H$_c$) are determined from the cooling step, while melting temperature and heat of fusion (H$_f$) are determined from the second heating step Tensile Modulus; Tensile strain at break are measured according to ISO 527-2 (cross head speed=1 mm/min; 23° C.) using injection molded specimens as described in EN ISO 1873-2 (dog bone shape, 4 mm thickness).

Charpy notched impact strength is determined according to ISO 180/1A at 23° C., and at −20° C. by using injection moulded test specimens as described in EN ISO 1873-2 (80×10×4 mm)

Flexural Modulus The flexural modulus was determined in 3-point-bending according to ISO 178 on injection molded specimens of 80×10×4 mm prepared in accordance with ISO 294-1:1996.

Porosity (catalyst): BET with N$_2$ gas, ASTM 4641, apparatus Micromeritics Tristar 3000; sample preparation: at a temperature of 50° C., 6 hours in vacuum.

Surface area (catalyst): BET with N$_2$ gas ASTM D 3663, apparatus Micromeritics Tristar 3000: sample preparation at a temperature of 50° C., 6 hours in vacuum.

Median particle size d50 (Laser diffraction) is calculated from the particle size distribution [mass percent] as determined by laser diffraction (Mastersizer) according to ISO 13320-1.

Median particle size d50 (Sedimentation) is calculated from the particle size distribution [mass percent] as determined by gravitational liquid sedimentation according to ISO 13317-3 (Sedigraph).

Cutoff particle size d95 (Sedimentation) is calculated from the particle size distribution [mass percent] as determined by gravitational liquid sedimentation according to ISO 13317-3 (Sedigraph)

Specific surface area is determined as the BET surface according to DIN 66131/2.

Ash content: Ash content is measured according to ISO 3451-1 (1997)

Examples

The two experimental heterophasic propylene copolymers HECO1 (A) and HECO1 (B) were produced in a Borstar pilot plant with a prepolymerization reactor, one slurry loop reactor and three gas phase reactors. The catalyst Polytrack 8502, commercially available from Grace (US) was used in combination with diethylaminotriethoxysilane [Si(OCH$_2$CH$_3$)$_3$(N (CH$_2$CH$_3$)$_2$)] as external donor and triethylaluminium (TEAL) as activator and scavenger in the ratios indicated in table 1. The catalyst was modified by polymerising a vinyl compound in the presence of the catalyst system.

TABLE 1

Preparation of the heterophasic propylene copolymers (HECO1)

| Parameter | unit | HECO1 (A) | HECO1 (B) |
|---|---|---|---|
| Prepolymerization | | | |
| temperature | [° C.] | 30 | 30 |
| pressure | [kPa] | 5200 | 5200 |
| Al/donor ratio | [mol/mol] | 10 | 10 |
| residence time | [h] | 0.5 | 0.5 |
| Loop | | | |
| temperature | [° C.] | 72 | 70 |
| pressure | [kPa] | 5450 | 5500 |
| residence time | [h] | 0.3 | 0.5 |
| ethylene feed | [kg/h] | 0 | 0 |
| H$_2$/C$_3$ ratio | [mol/kmol] | 18 | 20 |
| GPR 1 | | | |
| temperature | [° C.] | 80 | 80 |
| pressure | [kPa] | 1600 | 1600 |
| residence time | [h] | 1.7 | 1.7 |
| ethylene feed | [kg/h] | 0.2 | 0.2 |
| H$_2$/C$_3$ ratio | [mol/kmol] | 132 | 130 |
| GPR 2 | | | |
| temperature | [° C.] | 80 | 80 |
| pressure | [kPa] | 2700 | 2700 |
| residence time | [h] | 2.3 | 2.3 |
| ethylene feed | [kg/h] | 32.2 | 32.2 |
| H$_2$/C$_3$ ratio | [mol/kmol] | 21 | 21 |
| C$_2$/C$_3$ ratio | [mol/kmol] | 300 | 300 |
| GPR 3 | | | |
| temperature | [° C.] | 85 | 85 |
| pressure | [kPa] | 2600 | 2600 |
| residence time | [h] | 1.2 | 1.2 |
| ethylene feed | [kg/h] | 16 | 17 |
| H$_2$/C$_2$ ratio | [mol/kmol] | 69 | 70 |
| C$_2$/C$_3$ ratio | [mol/kmol] | 300 | 300 |

As the second heterophasic propylene copolymer (HECO2) the commercial grade Borsoft SD233CF was used. All polymers were characterised as listed in table 2.

TABLE 2

Characteristics of the polymers used in the examples

| | Unit | HECO1 (A) | HECO1 (B) | HECO2 |
|---|---|---|---|---|
| MFR | [g/10 min] | 29 | 36 | 8 |
| C2 total | [wt.-%] | 11 | 12.5 | 8 |
| C2 of XCI | [wt.-%] | 0 | 0 | 2.5 |
| g' | [—] | 1.0 | 1.0 | 1.0 |
| 2,1 | [%] | 0 | 0 | 0 |

TABLE 2-continued

Characteristics of the polymers used in the examples

|  | Unit | HECO1 (A) | HECO1 (B) | HECO2 |
|---|---|---|---|---|
| mmmm | [%] | 98 | 98 | n.d. |
| C2 of XS | [wt.-%] | 36 | 33 | 25 |
| IV of XCS | dl/g | 3 | 3 | 1.2 |
| XCS total | wt.-% | 30 | 28 | 23 |

XCS xylene cold soluble fraction
XCI xylene cold insoluble fraction
2,1 <2,1> erythro regiodefects of the matrix (XCI fraction)
mmmm pentade fraction of the matrix (XCI fraction)
g' branching index g' of the matrix (XCI fraction)
n.d. not determined The polymer compositions for the examples and comparative examples as listed in table 3 were melt blended on a co-rotating twin screw extruder type Coperion ZSK 40 (screw diameter 40 mm, L/D ratio 38) at temperatures in the range of 200-240° C., using a high intensity mixing screw configuration with two sets of kneading blocks.

TABLE 3

Compositions

| Component* | unit | CE1 | CE2 | CE3 | CE4 | IE1 | IE2 | IE3 |
|---|---|---|---|---|---|---|---|---|
| HECO1 (A) | [wt.-%] | 77 | 82 | 67 | 57 | 52 | — | — |
| HECO 1 (B) | [wt.-%] | — | — | — | — | — | 52 | 52 |
| HECO 2 | [wt.-%] | — | — | — | 20 | 20 | 20 | 13 |
| Talc 1 | [wt.-%] | — | — | — | — | — | 15 | 15 |
| Talc 2 | [wt.-%] | 15 | 15 | 15 | 15 | 15 | — | — |
| HMS-PP | [wt.-%] | 5 | 0 | 5 | 5 | 5 | 5 | 7 |
| NA | [wt.-%] | 0.2 | 0.2 | 0.2 | 0.2 | 0.2 | 0.2 | 0.2 |
| PE 1 | [wt.-%] | — | — | 10 | 0 | 5 | 5 | — |
| PE2 | [wt.-%] | — | — | — | — | — | — | 7 |

*Rest to 100 wt.-% are additives, like antioxidants
"Talc 1" is the commercial talc Jetfine 3CA of Luzenac having median particle size d50 of 1 μm (sedigraph), a cutoff particle size d95 of 3.3 μm (sedigraph) as well as a specific surface area of 14.5 m²/g,
"Talc 2" is the commercial talc HAR T84 of Luzenac is having a median particle size d50 of 2 μm (sedigraph) and 11 μm (laser), respectively, a cutoff particle size d95 of 10 μm (sedigraph) as well as a specific surface area of 16 m²/g,
"HMS-PP" is the commercial high melt strength polypropylene Daploy ™ WB135HMS of Borealis based on a propylene homopolymer, wherein the high melt strength polypropylene Daploy ™ WB135HMS has a density of 905 kg/m³, a melting point of 164° C., an MFR₂ (230° C.) of 2.4 g/10 min, a melt strength of 32 cN at a maximum speed of 250 mm/s, a xylene cold soluble fraction (XCS) of 0.4 wt.-% and a branching index g' of 0.78,
"NA" is the commercial α-nucleating agent NA-21E of Adeka Palmarole France comprising aluminium-hydroxy-bis[2,2'-methylene-bis(4,6-di-tert-butylphenyl)phosphate] and Li-myristate,
"PE1" is the commercial product Engage 8200 of Dow Elastomers, having an MFR 190° C./2.16 kg of 5.0 g/10 min and a density of 870 kg/m³,
"PE2" is the commercial product Engage 8100 of Dow Elastomers, having an MFR 190° C./2.16 kg of 1.0 g/10 min and a density of 870 kg/m³,

TABLE 4

Properties of the compositions

| Component | unit | CE1 | CE2 | CE3 | CE4 | IE1 | IE2 | IE3 |
|---|---|---|---|---|---|---|---|---|
| ASH CONTENT | [wt.-%] | 14.1 | 14.1 | 13.7 | 14 | 14.2 | 14.3 | 14.3 |
| MFR | [g/10 min] | 22.7 | 25.3 | 18.3 | 14.5 | 12.7 | 14.2 | 13.8 |
| TM | [MPa] | 2194 | 2143 | 1788 | 2018 | 1758 | 1658 | 1644 |
| TSB | [%] | 26.17 | 16.8 | 94.6 | 50.7 | 326.9 | 326 | 317 |
| FM | [MPa] | 2176 | 2067 | 1743 | 1964 | 1764 | 1608 | 1616 |
| IS (23° C.) | kJ/m² | 9.4 | 9 | 43 | 13.8 | 32.7 | 45.1 | 53 |
| IS (−20° C.) | kJ/m² | 3.7 | 3.7 | 6.6 | 4.3 | 5.3 | 4 | 4.3 |

TM tensile modulus
TSB tensile strain at break
FM flexural modulus
IS (23° C.) Charpy impact strength at 23° C.
IS (−20° C.) Charpy impact strength at −20° C.

The invention claimed is:

1. Polypropylene composition comprising:
(A) a first heterophasic propylene copolymer (HECO1) comprising (i) a polypropylene (PP1) having a melt flow rate MFR₂ (230° C.) measured according to ISO 1133 in the range of 50 to 500 g/10 min, and (ii) an elastomeric propylene copolymer (E1) having (a) a propylene content in the range of 50 to 80 wt. %, and (b) an intrinsic viscosity (IV) measured according to ISO 1628-1 (at 135° C. in decaline) of equal or more than 2.5 dl/g, (B) a high melt strength polypropylene (HMS-PP) having (i) a branching index g' of below 1.0, and (ii) a melt flow rate MFR₂ (230° C.) measured according to ISO 1133 of equal or below 15 g/10 min, (c) a second heterophasic propylene copolymer (HECO2) comprising (i) a random propylene copolymer (R-PP2) having (a) a melt flow rate MFR₂ (230° C.) measured according to ISO 1133 in the range of 1 to 40 g/10 min, a branching index g' being higher than the branching index g' of the high melt strength polypropylene (HMS-PP), and (c) a comonomer content of equal or more than 0.5 wt. %, the comonomers are ethylene and/or C₄ to C₁₂ α-olefins, (ii) an elastomeric propylene copolymer (E2) having (a) a propylene content in the range of 50 to 80 wt. %, and (b) an intrinsic viscosity (IV) measured according to ISO 1628-1 (at 135° C. in decaline) of equal or below 2.4 dl/g,(d) a polyethylene plastomer (PE) having (i) an ethylene content of at least 50 wt. %, and (ii) a density measured according to ISO 1183-187 in the range of 820 to 920 kg/m³, and (e) a mineral filler (F).

2. Polypropylene composition according to claim 1, wherein the composition has (a) a melt flow rate MFR₂ (230° C.) measured according to according to ISO 1133 in the range of 5 to 50 g/10 min, and/or (b) a tensile modulus measured according to ISO 527-3 of at least 1500 MPa and/or (c) a tensile strain at break measured according to ISO 527-3 of at least 200%.

3. Polypropylene composition according to claim 1, wherein the first heterophasic propylene copolymer (HECO1) has (a) a melt flow rate MFR₂ (230° C.) measured according to according to ISO 1133 in the range of 15 to 70 g/10 min, and/or (b) a xylene cold soluble (XCS) fraction measured according to ISO 6427 of 15.0 to 50.0 wt. %.

4. Polypropylene composition according to claim 1, wherein the second heterophasic propylene copolymer (HECO2) has (a) a melt flow rate MFR$_2$ (230° C.) measured according to according to ISO 1133 in the range of 1 to below 15 g/10 min, and/or (b) a xylene cold soluble (XCS) fraction measured according to ISO 6427 of 10.0 to 35.0 wt. %.

5. Polypropylene composition according to claim 1, wherein (a) the polypropylene (PP1) is a propylene homopolymer (H-PP1) and/or (b) the random propylene copolymer (R-PP2) has a comonomer content in the range of 0.5 to 5.0 wt. %, the comonmers are ethylene and optionally at least one C$_4$ to C$_{12}$ α-olefin.

6. Polypropylene composition according to claim 1, wherein (a) the comonmers of the elastomeric propylene copolymers (E1) and (E2) are identical, and/or (b) the first heterophasic propylene copolymer (HECO1) and/or the second heterophasic propylene copolymer (HECO2) comprise a polymeric α-nucleating agent selected from the group consisting of vinylcycloalkane polymer and/or vinylalkane polymer.

7. Polypropylene composition according to claim 1, wherein the high melt strength polypropylene (HMS-PP) has (a) a strain hardening behavior with a haul-off force F$_{max}$ of at least 10.0 cN and a draw down velocity V$_{max}$ of at least 200 mm/s, and/or (b) a melt flow rate MFR$_2$ (230° C.) measured according to ISO 1133 of 0.5 to 10.0 g/10 min.

8. Polypropylene composition according to claim 1, wherein the high melt strength polypropylene (HMS-PP) (a) comprises units derived from (i) propylene and (ii) bifunctionally unsaturated monomer(s) and/or multifunctionally unsaturated low molecular weight polymer(s), and/or (b) has a xylene hot insoluble fraction (XHI) of not more than 1.0 wt. %.

9. Polypropylene composition according to claim 1, wherein the polyethylene plastomer (PE) is an elastomeric ethylene-octene copolymer.

10. Polypropylene composition according to claim 1, wherein the mineral filler (F) is talc.

11. Polypropylene composition according to claim 1, wherein the composition comprises an α-nucleating agent (NA) selected from the group consisting of (a) salts of monocarboxylic acids and polycarboxylic acids, (b) dibenzylidenesorbitol and C$_1$-C$_8$-alkyl-substituted dibenzylidenesorbitol derivatives, (c) substituted nonitol-derivatives, (d) salts of diesters of phosphoric acid, (e) trisamide-benze derivatives, and (f) mixtures thereof.

12. Polypropylene composition according to claim 1, wherein the composition comprises (a) 40 to 70 wt. % of the first heterophasic propylene copolymer (HECO1), (b) 10 to 40 wt. % of the second heterophasic propylene copolymer (HECO2) (c) 1 to 10 wt. % of the high melt strength polypropylene (HMS-PP), (d) 1 to 10 wt.% of the polyethylene plastomer (PE), (e) 5 to 30 wt. % of the mineral filler (F), and (f) optionally 0.0005 to 1.0 wt. % of the nucleating agent (NA).

13. Polypropylene composition being a heterophasic system comprising:
(a) a high melt strength polypropylene (HMS-PP) having (i) a branching index g' of below 1.0, and (ii) a melt flow rate MFR$_2$ (230° C.) measured according to ISO 1133 of equal or below 15 g/10 min,(b) a polypropylene (PP1) having a melt flow rate MFR$_2$ (230° C.) measured according to ISO 1133 in the range of 50 to 500 g/10 min, (c) a random propylene copolymer (R-PP2) having (i) a melt flow rate MFR$_2$ (230° C.) measured according to according to ISO 1133 in the range of 1 to 40g/10 min, (ii) a branching index g' being higher than the branching index g' of the high melt strength polypropylene (HMS-PP), and (iii) a comonmer content of equal or more than 0.5 wt. %, the comonomers are ethylene and/or C$_4$ to C$_{12}$ α-olefins, (d) an elastomeric propylene copolymer system having (i) a propylene content in the range of 50 to 80 wt. %, and (ii) an intrinsic viscosity (IV) measured according to ISO 1628-1 (at 135° C. in decaline) in the range of 2.0 to 3.0 dl/g, (e) a polyethylene plastomer (PE) having (i) an ethylene content of at least 50 wt. %, and (ii) a density measured according to ISO 1183-187 in the range of 820 to 920 kg/m$^3$, and (f) a mineral filler (F), wherein the polypropylene (PP1), the random propylene copolymer (R-PP2), and the high melt strength polypropylene (HMS-PP) constitute the matrix of the heterophasic system in which the elastomric propylene copolymer system, the polyethylene plastomer (PE) and the mineral filler (F) are dispersed, and wherein further the polypropylene composition has (g) a tensile modulus measured according to ISO 527-3 of at least 1500 MPa and (h) tensile strain at break measured according to ISO 527-3 of at least 200%.

14. Automotive article comprising a composition according to claim 1.

15. Process for producing a composition according to claim 1, comprising the step of mixing up of the first heterophasic propylene copolymer (HECO1), the second heterophasic propylene copolymer (HECO2), the high melt strength polypropylene (HMS-PP), the polyethylene plastomer (PE), the mineral filler (F), and optionally the a-nucleating agent (NA) in an extruder.

* * * * *